(12) United States Patent
Han et al.

(10) Patent No.: US 11,424,852 B1
(45) Date of Patent: Aug. 23, 2022

(54) METHOD AND APPARATUS FOR ENHANCED LINK TRAINING IN A WIRELINE COMMUNICATIONS SYSTEM

(71) Applicant: Marvell Asia Pte, Ltd., Singapore (SG)

(72) Inventors: Xu Han, San Jose, CA (US); Lenin Patra, Dublin, CA (US); Ka Kit Ling, Fremont, CA (US); Kuang-Yu Wang, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/305,020

(22) Filed: Jun. 29, 2021

Related U.S. Application Data

(60) Provisional application No. 63/045,706, filed on Jun. 29, 2020.

(51) Int. Cl.
*H04L 1/00* (2006.01)
*H04B 3/04* (2006.01)

(52) U.S. Cl.
CPC ............ *H04L 1/0015* (2013.01); *H04B 3/04* (2013.01); *H04L 1/003* (2013.01); *H04L 1/0047* (2013.01)

(58) Field of Classification Search
CPC ..... H04L 1/0015; H04L 1/003; H04L 1/0047; H04B 3/04
See application file for complete search history.

(56) References Cited

U.S. PATENT DOCUMENTS

| | | | | |
|---|---|---|---|---|
| 2007/0147475 A1* | 6/2007 | Yamamoto | ............ | H04L 1/0066 375/130 |
| 2010/0226420 A1* | 9/2010 | Adar | ............ | H04L 1/20 375/232 |
| 2011/0206141 A1* | 8/2011 | Barrett | ............ | H04L 5/1438 375/259 |
| 2020/0153548 A1* | 5/2020 | Lusted | ............ | H04L 1/0057 |
| 2020/0394148 A1* | 12/2020 | Regan | ............ | G06F 13/20 |

* cited by examiner

*Primary Examiner* — David B Lugo

(57) ABSTRACT

Training a link between a physical layer transceiver and a link partner includes encoding, at the physical layer transceiver, a first number of training bits into a second number of encoded training bits, expanding at the physical layer transceiver the second number of encoded training bits into a third number of expanded training bits, and interpolating at the physical layer transceiver, in a first mode, between the third number of expanded training bits and a fourth number of interpolated training bits. The fourth number is more than twice the third number, and may be four times the third number. Such training may further include interpolating at the physical layer transceiver, in a second mode, between the third number of expanded training bits and the fourth number of interpolated training bits, fourth number being twice the third number. The second mode may be used when the first mode is not supported.

20 Claims, 5 Drawing Sheets

METHOD AND APPARATUS FOR ENHANCED LINK TRAINING IN A WIRELINE COMMUNICATIONS SYSTEM

CROSS REFERENCE TO RELATED APPLICATION

This disclosure claims the benefit of copending, commonly-assigned U.S. Provisional Patent Application No. 63/045,706, filed Jun. 29, 2020, which is hereby incorporated by reference herein in its entirety.

FIELD OF USE

This disclosure relates to improving the accuracy of wireline data exchanges. More particularly, this disclosure relates to improving decoding accuracy of data exchanges in wireline systems, such as Ethernet systems, by increasing the number of bits used for training.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Initiation of wireline communications between physical layer transceivers, such as Ethernet communications under various versions of the IEEE 802.3 standard, includes a training period involving the exchange of training data. However, as data rates increase relative to the amount of training data, the chance for transmission error also increases, decreasing the likelihood of successful decoding.

SUMMARY

In a physical layer transceiver, training circuitry, in accordance with implementations of the subject matter of this disclosure, for training a link with a link partner, includes encoder/decoder circuitry configured to convert between a first number of training bits and a second number of encoded training bits, expander/compressor circuitry configured to convert between the second number of encoded training bits and a third number of expanded training bits, and interpolator/decimator circuitry configured to operate in a first mode to convert between the third number of expanded training bits and a fourth number of interpolated training bits, wherein the fourth number is more than twice the third number.

In a first implementation of such training circuitry, in the first mode of the interpolator/decimator circuitry, the fourth number may be four times the third number.

In a second implementation of such training circuitry, the interpolator/decimator circuitry may be further configured to operate in a second mode wherein the fourth number is twice the third number.

In a third implementation of such training circuitry of, the third number may be 64, In the first mode, the fourth number may be 256, and in the second mode, the fourth number may be 128.

In a fourth implementation of such training circuitry, the encoder/decoder circuitry may implement Differential Manchester Encoding.

In a fifth implementation of such training circuitry, the second number may be twice the first number.

In a sixth implementation of such training circuitry, the third number may be four times the second number.

In a seventh implementation of such training circuitry, the first number may be 8, the second number may be 16, the third number may be 64, and the fourth number may be 256.

A method, according to implementations of the subject matter of this disclosure, for training a link between a physical layer transceiver and a link partner, includes encoding at the physical layer transceiver a first number of training bits into a second number of encoded training bits, expanding at the physical layer transceiver the second number of encoded training bits into a third number of expanded training bits, and interpolating at the physical layer transceiver, in a first mode, between the third number of expanded training bits and a fourth number of interpolated training bits, wherein the fourth number is more than twice the third number.

In a first implementation of such a method, in the interpolating, the fourth number may be four times the third number.

A second implementation of such a method may further include interpolating at the physical layer transceiver, in a second mode, between the third number of expanded training bits and the fourth number of interpolated training bits, where the fourth number is twice the third number.

A first aspect of that second implementation, may further include determining, at the physical layer transceiver, whether the link partner supports the first mode, when it is determined that the link partner supports the first mode, performing the interpolating in the first mode, and when it is determined that the link partner does not support the first mode, performing the interpolating in the second mode.

In a first instance of that first aspect, the determining may be performed during negotiation with the link partner.

In a third implementation of such a method, the third number may be 64, in the first mode, the fourth number may be 256, and in the second mode, the fourth number may be 128.

In a fourth implementation of such a method, the encoding may be performed using Differential Manchester Encoding.

In a fifth implementation of such a method, the second number may be twice the first number.

In a sixth implementation of such a method, the third number may be four times the second number.

In a seventh implementation of such a method, the first number may be 8, the second number may be 16, the third number may be 64, and the fourth number may be 256.

A wireline communications system according to implementations of the subject matter of this disclosure includes a wireline communications medium, a first physical layer transceiver coupled to the wireline communications medium, and a second physical layer transceiver coupled to the wireline communications medium, wherein each respective one of the first physical layer transceiver and the second physical layer transceiver includes respective training circuitry, for training a link with the other respective one of the first physical layer transceiver and the second physical layer transceiver, the respective training circuitry including respective encoder/decoder circuitry configured to convert in either direction between a first number of training bits and a second number of encoded training bits, respective expander/compressor circuitry configured to convert in either direction between the second number of encoded training bits and a third number of expanded training bits, and respective interpolator/decimator circuitry configured to operate in a first mode to convert in either direction between the third number of expanded training bits and a fourth number of interpolated training bits, where the fourth number is more than twice the third number.

In a first implementation of such a wireline communications system, the respective interpolator/decimator circuitry may be further configured to operate in a second mode where the fourth number is twice the third number.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Link partners on a wireline communications link, such as Ethernet physical layer transceivers on a wired or backplane Ethernet connection, typically perform a training procedure to establish a link with the lowest possible bit error rate. The link partners typically begin by exchanging a list of capabilities, including transmission rates and equalization capabilities, and agreeing on a training rate (typically the highest common rate among the two sets of capabilities). The two link partners begin exchanging training data at the agreed rate, with each partner applying equalization to the data and examining the resulting equalized data (e.g., data eye characteristics), and requesting that the other partner retransmit at different rates and/or filter settings until each partner is satisfied with the received data.

Figure 1:
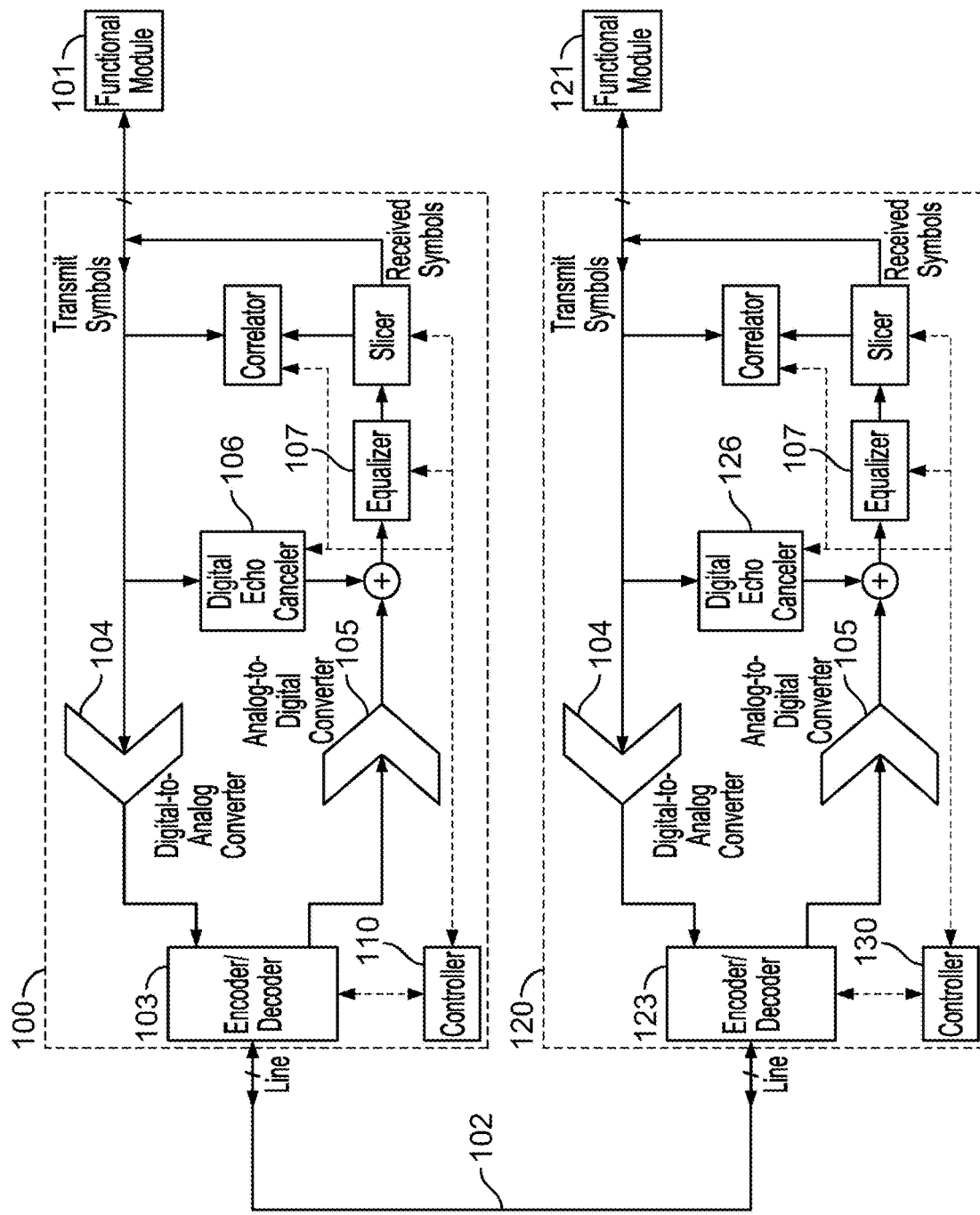
FIG. 1 is a schematic representation of a wireline communications system in accordance with implementations of the subject matter of this disclosure.

A wireline communications system may have the general structure shown in FIG. 1. A first physical layer transceiver (PHY) 100 couples a first host, such as functional module 101, to wireline channel medium (cable) 102, using encoding and decoding circuitry 103. One or more adaptive filters, shown as echo canceller(s) 106, but also potentially including near-end crosstalk (NEXT) canceller(s) and far-end crosstalk (FEXT) canceller(s), filter the effects of interference from echo and/or near-end crosstalk and/or far-end crosstalk, respectively. A second PHY 120 couples a second host, such as functional module 121, to wireline channel medium (cable) 102, using encoding and decoding circuitry 123. One or more adaptive filters, shown as echo canceller(s) 126, but also potentially including near-end crosstalk (NEXT) canceller(s) and far-end crosstalk (FEXT) canceller(s), filter the effects of interference from echo and/or near-end crosstalk and/or far-end crosstalk, respectively.

In some implementations according to the subject matter of this disclosure, PHY 100 transmits data through digital-to-analog converter 104 from functional module 101 onto link 102 via encoder/decoder 103, and receives from link 102, via encoder/decoder 103 through analog-to-digital converter 105, a remote (target) signal and an echo of the transmitted signal, for delivery to functional module 101. Digital echo canceler 106 may be used to remove the echo, and may also include near-end crosstalk (NEXT) canceller(s) and far-end crosstalk (FEXT) canceller(s), to filter the effects of interference from echo and/or near-end crosstalk and/or far-end crosstalk, respectively. Equalizer 107 is used to enhance the quality of the received remote signal. The remote signal may be from functional module 121, transmitted onto link 102 by PHY 120.

Figure 2:
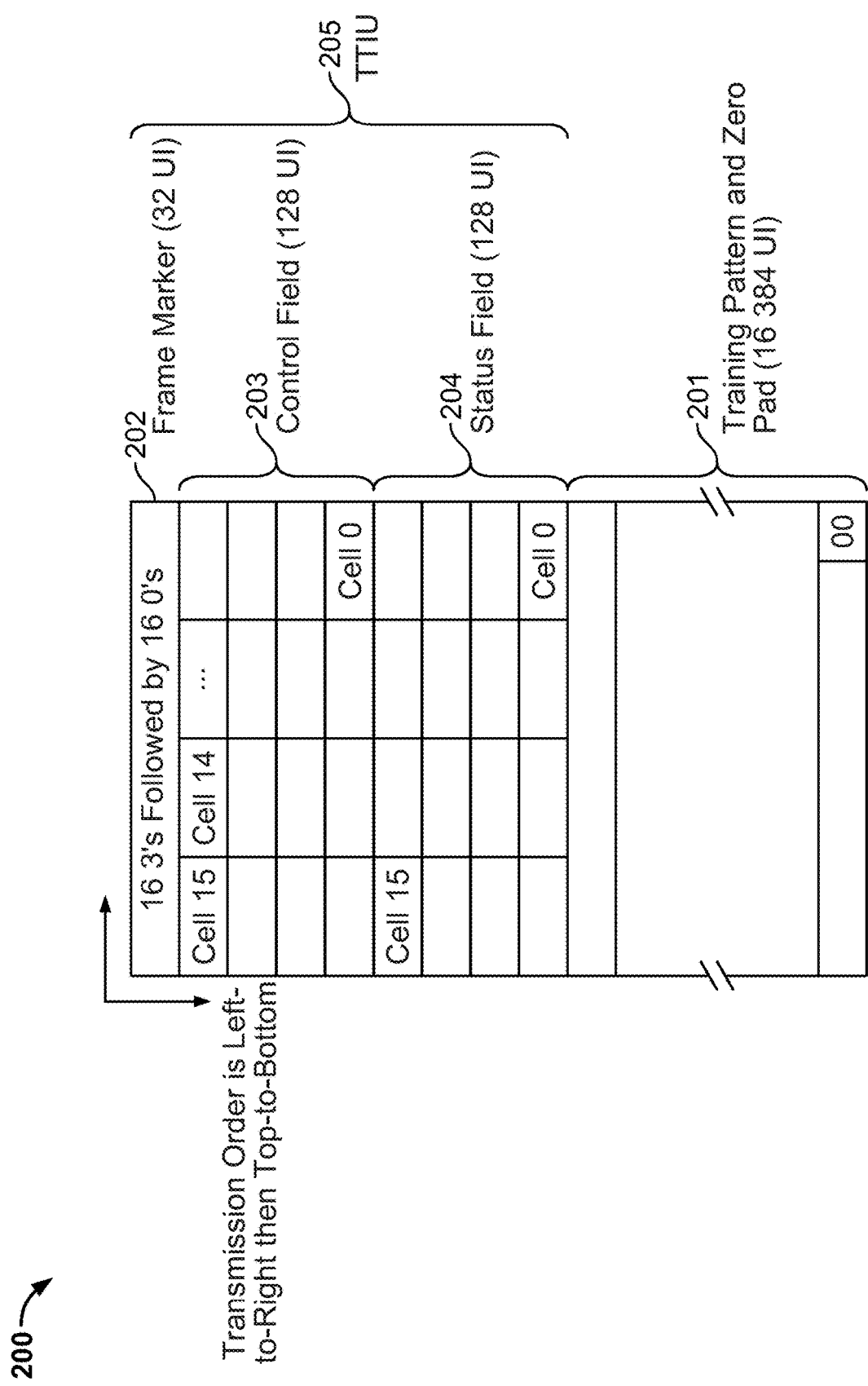
FIG. 2 is a representation of a training frame structure which may be used in implementations of the subject matter of this disclosure.

A training mode is used to establish a link between PHY 100 and PHY 120. In that training mode, training data is processed through training circuitry including encoder/decoder 103 for transmission onto link 102. In an implementation of a 100 Gbps system such as 100GBASE-KR under the IEEE 802.3ck standard, used over backplanes, the training data may have the training frame structure 200 shown in FIG. 2. Training pattern 201 includes $2^{14}$=16384 unit intervals (UI), each of which is occupied by one data value. In some implementations, the data values may be bits (i.e., '0' or '1'), but in other implementations, the data may be encoded using 4-level pulse amplitude modulation (PAM-4) where each data value can be '0', '1', '2' or '3'. Training pattern 201 is preceded by frame marker 202, control field 203 and status field 204, which collectively may be referred to as the Transmitter Training Information Unit (TTIU) 205. Frame marker 202 may occupy 32 UI, which in a PAM-4 implementation may be 16 3's followed by 16 0's. Control field 203 and status field 204 may each occupy 128 UI.

Figure 3:
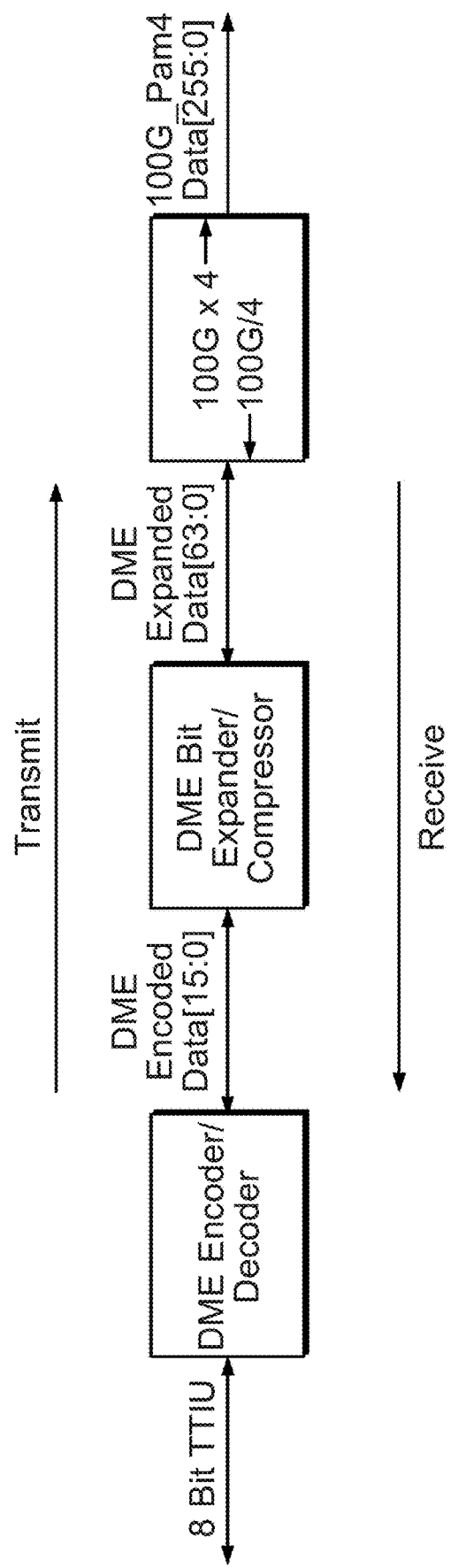
FIG. 3 is a diagrammatic representation of data flow in implementations of the subject matter of this disclosure.

In accordance with implementations of the subject matter of this disclosure, when one of PHY 100 and PHY 120 is acting in its role as transmitter, bits of TTIU 205 are processed (e.g., in training circuitry including encoder/decoder 103) as shown in FIG. 3, with every 8 bits transformed into 128 bits of data for transmission onto link 102 to train a connection with its remote link partner, which may be the other one of PHY 100 and PHY 120, or may be another link partner. First, 8 bits 300 are provided by controller 110/130 and encoded using, for example, Differential Manchester Encoding (DME) in DME encoder/decoder 301. In DME, a '0' becomes either '00' or '11', while a '1' becomes either '01' or '10'. Thus, the number of bits is doubled so that 8 bits 300 become 16 DME-encoded bits 311.

The 16 DME-encoded bits 311 of this implementation are expanded in DME bit-expander/compressor 302. During expansion, each '0' becomes four zeroes, while each '1' becomes four ones, so that the 16 DME-encoded bits 311 become 64 bits of DME expanded data 312. The 64 bits of DME expanded data 312 are processed in bit interpolator/decimator 303 to interpolate every bit three additional times (so that each bit again becomes four identical bits), yielding, in this implementation 256 bits of converted 100 Gbps training data 313.

The process is reversed during training when PHY 100 or PHY 120 is acting in its role as receiver (which happens alternately with its role as transmitter during the training). 256 bits of received 100 Gbps training data 313 are processed in bit interpolator/decimator 303 (decimating each group of four bits into one bit) to yield 64 bits of DME expanded data 312. In this direction, DME bit-expander/compressor 302 compresses the 64 bits of DME expanded data 312 to yield 16 DME-encoded bits 311. The 16 DME-encoded bits 311 are decoded in DME encoder/decoder 301 to yield 8 TTIU bits 300 for processing by controller 310.

However, the link partner may be a device that does not implement the subject matter of this disclosure, but rather, for example, is a typical implementation under the IEEE 802.3ck standard. Such a device will not have a bit interpolator/decimator 303 capable of converting 64 bits of DME expanded data into 256 bits of converted 100 Gbps training data, or of converting 256 bits of 100 Gbps training data back into 64 bits of DME expanded data. Instead, it may include a bit interpolator/decimator capable of converting 64 bits of DME expanded data into 128 bits of converted 100 Gbps training data, or of converting 128 bits of 100 Gbps training data back into 64 bits of DME expanded data.

Therefore, the training mode according to implementations of the subject matter of this disclosure, such as the implementation according to FIG. 3, operates when training circuitry in both link partners includes bit interpolator/decimator 303 and can convert 64 bits of DME expanded data into 256 bits of converted 100 Gbps training data, and can convert 256 bits of 100 Gbps training data back into 64 bits of DME expanded data, which is twice as many bits as a typical implementation under the IEEE 802.3ck standard. Implementations according to the subject matter of this disclosure, such as the implementation according to FIG. 3, thus have twice as many data bits to work with during link training, and therefore are expected to have a better decoding result during high-speed operations, as compared to devices operating in a training mode implemented under the IEEE 802.3ck standard. Therefore, devices implemented according to the subject matter of this disclosure may operate successfully at rates as high as 112 Gbps or greater.

Nevertheless, for compatibility with devices implemented under the IEEE 802.3ck standard, in which the bit interpolator/decimator converts 64 bits of DME expanded data into 128 bits of converted 100 Gbps training data, or converts 128 bits of 100 Gbps training data back into 64 bits of DME expanded data, bit interpolator/decimator 303 in implementations of the subject matter of this disclosure is also capable of interoperating with a bit interpolator/decimator in a remote link partner to process 128 bits of training data rather than 256 bits of training data. The determination to operate in the 256-bit mode or the 128-bit mode may be made, for example, during the initial negotiation between PHY 100 and the remote link partner, when the identity of the remote link partner becomes known to PHY 100.

Figure 4:
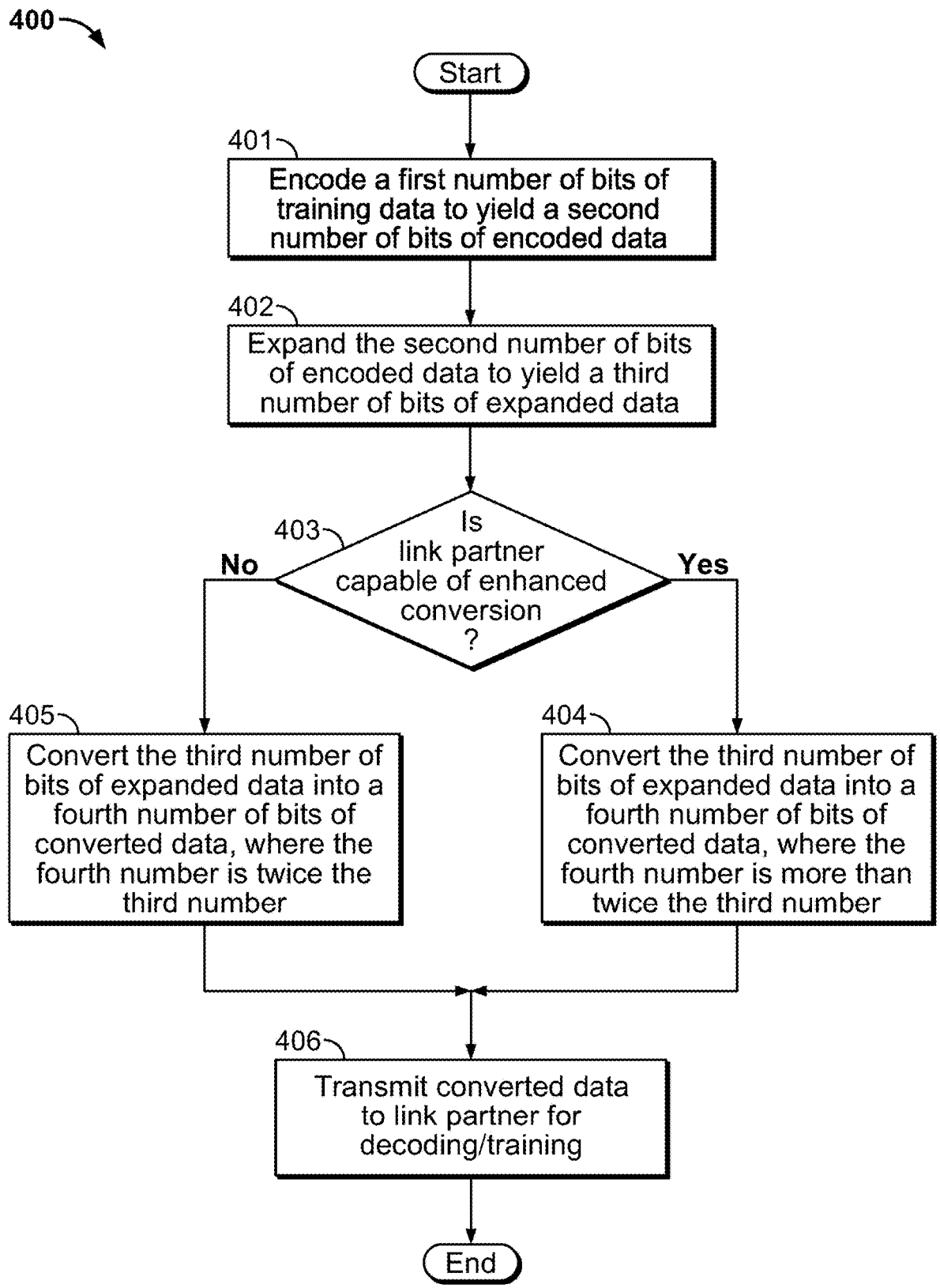
FIG. 4 is a flow diagram illustrating operation of implementations of the subject matter of this disclosure in the transmit direction.

In the transmit direction, implementations according to the subject matter of this disclosure may operate in accordance with method 400, diagrammed in FIG. 4. At 401, a first number of training bits (e.g., 8 training bits in the implementation shown in FIG. 3) of training data are encoded to yield a second number of encoded bits (e.g., 16 encoded bits in the implementation shown in FIG. 3) of encoded data. At 402, the encoded bits are expanded to yield a third number (e.g., 64 bits in the implementation shown in FIG. 3) of expanded bits.

At 403, it is determined whether the link partner is capable of enhanced data conversion (e.g., by interpolation/decimation) in accordance with implementations of the subject matter of this disclosure. If so, then at 404, the third number of expanded bits are interpolated to a fourth number of bits more than twice the third number of expanded bits (e.g., 256 bits, or four times the number of expanded bits, in the implementation shown in FIG. 3).

If at 403, it is determined that the link partner is not capable of enhanced data conversion in accordance with implementations of the subject matter of this disclosure, then at 405, the third number of expanded bits are interpolated to a fourth number of bits that is twice the third number of expanded bits (e.g., 128 bits; cf. FIG. 3).

At 406, the interpolated data bits output at 404 or 405 are transmitted by PHY 100 to the link partner for decoding to train the link being established, and method 400 ends.

Figure 5:
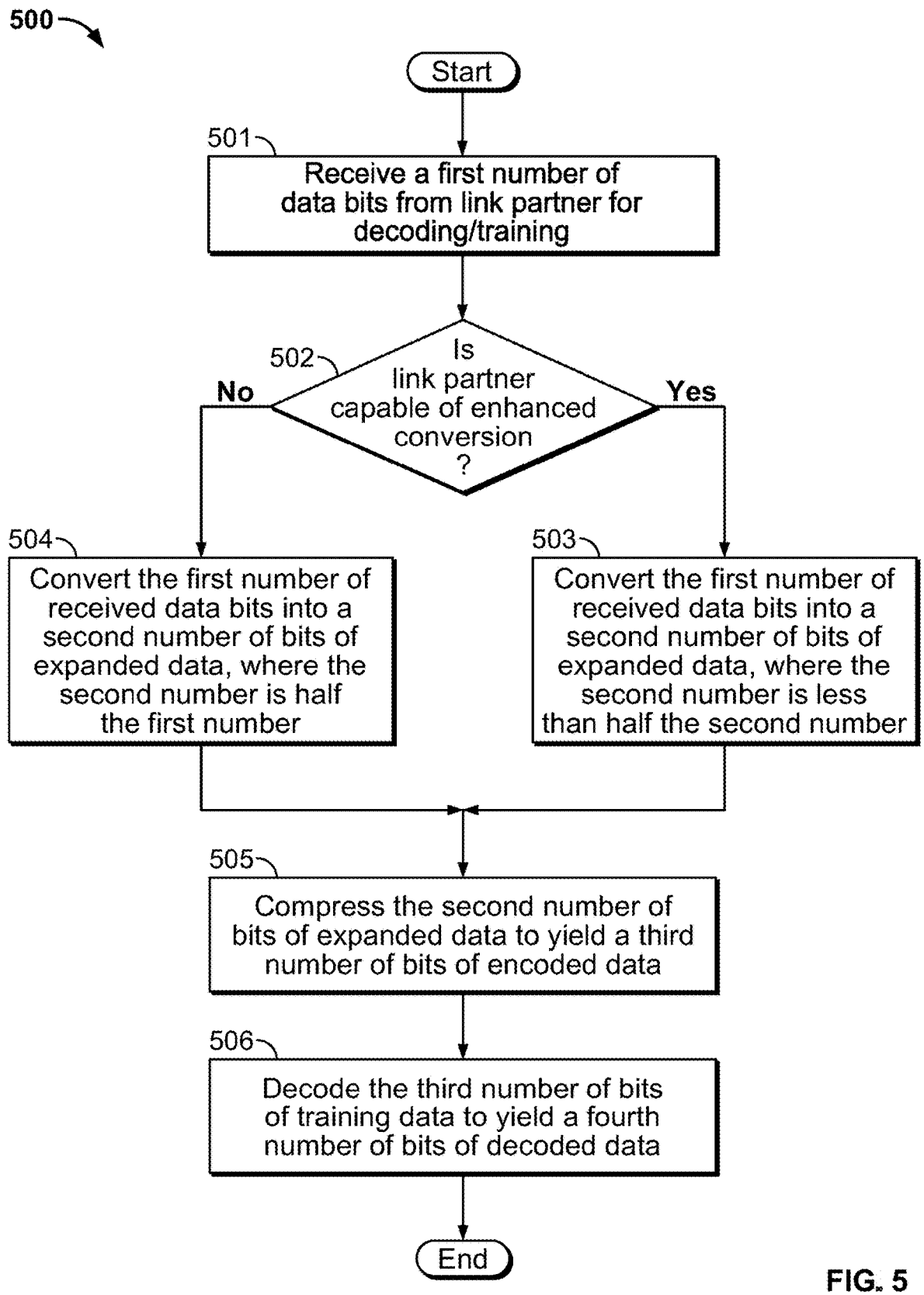
FIG. 5 is a flow diagram illustrating operation of implementations of the subject matter of this disclosure in the receive direction.

Similar data may be transmitted by the link partner and received by PHY 100 for decoding by PHY 100 to train the link. In the receive direction, implementations according to the subject matter of this disclosure may operate in accordance with method 500, diagrammed in FIG. 5.

At 501, a first number of data bits is received by PHY 100 from the link partner for decoding to train the link being established. At 502, it is determined whether the link partner is capable of enhanced data conversion (e.g., by interpolation/decimation) in accordance with implementations of the subject matter of this disclosure. If so, then the received data bits are assumed to have been interpolated at the link partner at a higher multiple than two-to-one, and at 503 the received data bits are decimated into a second number of bits of expanded data, where the second number is less than half the first number (e.g., one-quarter of the first number). But if at 502 it is determined that the link partner is not capable of enhanced data conversion in accordance with implementations of the subject matter of this disclosure, then the received data bits are assumed to have been interpolated at the link partner at a multiple of two-to-one, and at 504 the received data bits are decimated into a second number of bits of expanded data, where the second number is half the first number.

At 505, the expanded data bits output at 503 or 504 are compressed to yield a third number of bits of encoded data. At 506, the third number of bits of encoded data are decoded to yield a fourth number of bits of decoded data, and method 500 ends. The decoded output bits are used by controller 110/130 in training the link.

Thus it is seen that interpolated training data with more data bits—e.g., twice as many data bits—to work with during link training, so that training can be expected to have a better decoding result during high-speed operations, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Training circuitry in a physical layer transceiver, for training a link with a link partner, the training circuitry comprising:
  encoder/decoder circuitry configured to convert between a first number of training bits and a second number of encoded training bits;
  expander/compressor circuitry configured to convert between the second number of encoded training bits and a third number of expanded training bits; and
  interpolator/decimator circuitry configured to operate in a first mode to convert between the third number of expanded training bits and a fourth number of interpolated training bits by, when interpolating, repeating each bit in the expanded training bits by a repetition factor equal to the fourth number and, when decimating, reducing each group of the fourth number of bits to one bit, wherein the fourth number is more than twice the third number.

2. The training circuitry of claim 1, wherein in the first mode of the interpolator/decimator circuitry, the fourth number is four times the third number.

3. The training circuitry of claim 1, wherein the interpolator/decimator circuitry is further configured to operate in a second mode wherein the fourth number is twice the third number.

4. The training circuitry of claim 3, wherein:
the third number is 64;
in the first mode, the fourth number is 256; and
in the second mode, the fourth number is 128.

5. The training circuitry of claim 1, wherein the encoder/decoder circuitry implements Differential Manchester Encoding.

6. The training circuitry of claim 1, wherein the second number is twice the first number.

7. The training circuitry of claim 1, wherein the third number is four times the second number.

8. The training circuitry of claim 1, wherein:
the first number is 8;
the second number is 16;
the third number is 64; and
the fourth number is 256.

9. A method of training a link between a physical layer transceiver and a link partner, the method comprising:
encoding at the physical layer transceiver a first number of training bits into a second number of encoded training bits;
expanding at the physical layer transceiver the second number of encoded training bits into a third number of expanded training bits; and
interpolating at the physical layer transceiver, in a first mode, between the third number of expanded training bits and a fourth number of interpolated training bits by repeating each bit in the expanded training bits by a repetition factor equal to the fourth number, wherein the fourth number is more than twice the third number.

10. The method of claim 9, wherein in the interpolating, the fourth number is four times the third number.

11. The method of claim 9, further comprising interpolating at the physical layer transceiver, in a second mode, between the third number of expanded training bits and the fourth number of interpolated training bits, wherein the fourth number is twice the third number.

12. The method of claim 11, further comprising:
determining, at the physical layer transceiver, whether the link partner supports the first mode;
when it is determined that the link partner supports the first mode, performing the interpolating in the first mode; and
when it is determined that the link partner does not support the first mode, performing the interpolating in the second mode.

13. The method of claim 12 wherein the determining is performed during negotiation with the link partner.

14. The method of claim 11, wherein:
the third number is 64;
in the first mode, the fourth number is 256; and
in the second mode, the fourth number is 128.

15. The method of claim 9, wherein the encoding is performed using Differential Manchester Encoding.

16. The method of claim 9, wherein the second number is twice the first number.

17. The method of claim 9, wherein the third number is four times the second number.

18. The method of claim 9, wherein:
the first number is 8;
the second number is 16;
the third number is 64; and
the fourth number is 256.

19. A wireline communications system comprising:
a wireline communications medium;
a first physical layer transceiver coupled to the wireline communications medium; and
a second physical layer transceiver coupled to the wireline communications medium; wherein:
each respective one of the first physical layer transceiver and the second physical layer transceiver includes respective training circuitry, for training a link with the other respective one of the first physical layer transceiver and the second physical layer transceiver, the respective training circuitry comprising:
respective encoder/decoder circuitry configured to convert in either direction between a first number of training bits and a second number of encoded training bits;
respective expander/compressor circuitry configured to convert in either direction between the second number of encoded training bits and a third number of expanded training bits; and
respective interpolator/decimator circuitry configured to operate in a first mode to convert in either direction between the third number of expanded training bits and a fourth number of interpolated training bits by, when interpolating, repeating each bit in the expanded training bits by a repetition factor equal to the fourth number and, when decimating, reducing each group of the fourth number of bits to one bit, wherein the fourth number is more than twice the third number.

20. The wireline communications system of claim 19 wherein the respective interpolator/decimator circuitry is further configured to operate in a second mode wherein the fourth number is twice the third number.

* * * * *